Jan. 6, 1925.
M. LOUGHEAD
FLUID ACTUATED BRAKE
Filed Dec. 13, 1923
1,521,637
2 Sheets-Sheet 1
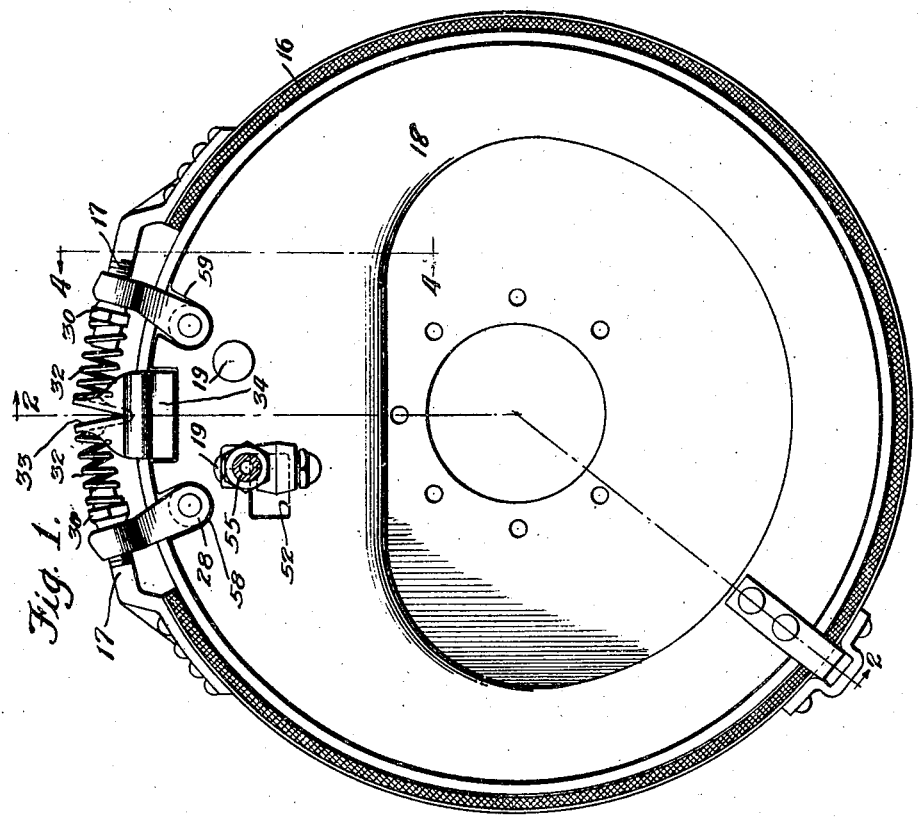
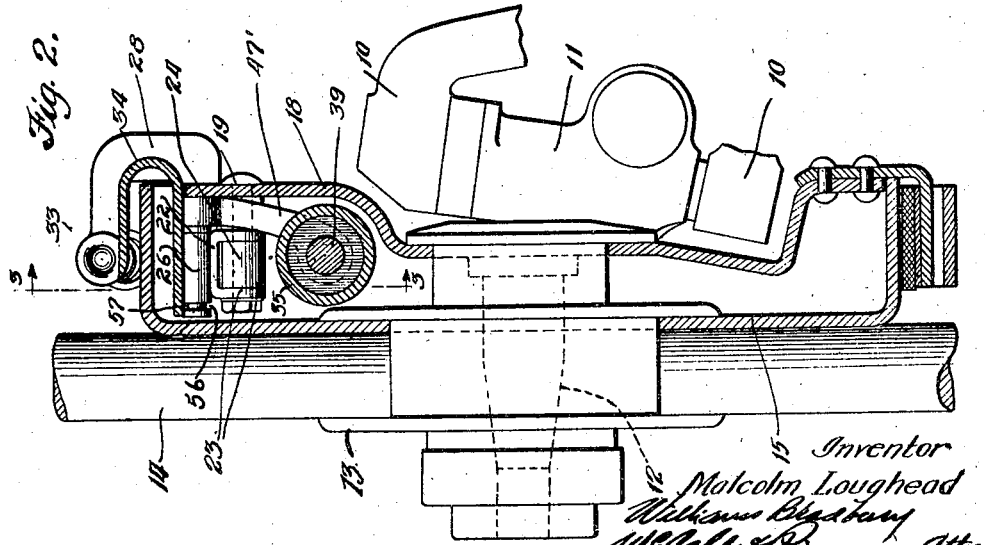
Inventor
Malcolm Loughead Jan. 6, 1925.
M. LOUGHEAD
FLUID ACTUATED BRAKE
Filed Dec. 13, 1923
1,521,637
2 Sheets-Sheet 2
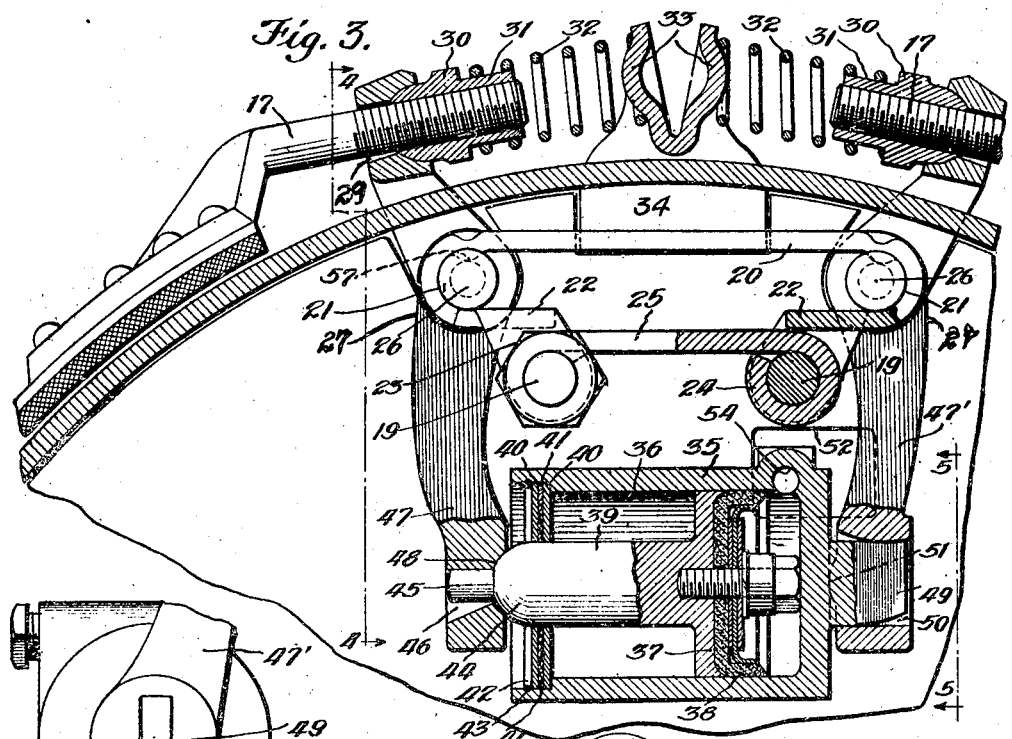
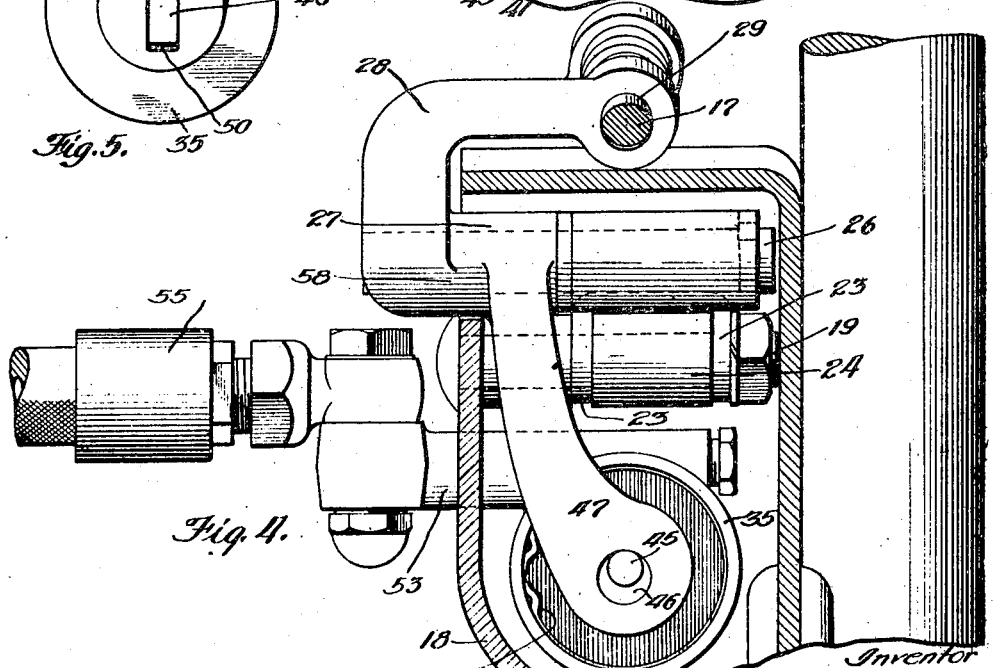

Patented Jan. 6, 1925.

1,521,637

UNITED STATES PATENT OFFICE.

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA.

FLUID-ACTUATED BRAKE.

Application filed December 13, 1923. Serial No. 680,293.

*To all whom it may concern:*

Be it known that I, MALCOLM LOUGHEAD, a citizen of the United States, and resident of Detroit, in the county of Wayne and State of Michigan, have invented a certain new and useful Improvement in Fluid-Actuated Brakes, of which the following is a full, clear, concise, and exact description, reference being had to the accompanying drawings, forming a part of this specification.

This invention relates to braking mechanism for automobiles, and particularly to brakes of the fluid actuated type.

The object of the invention is the provision of a device of this character which shall be simpler in construction than those heretofore provided, and one which will be easily assembled.

One of the features of the invention is the provision of a braking mechanism which is self-contained, thus permitting the brake mechanism to be removed and replaced as a unit.

Another feature of the invention is the provision of a floating brake operating cylinder which is supported by the brake operating levers.

Other features and advantages will appear from time to time as the description of the invention progresses.

It is believed the invention will be best understood by a detailed description thereof taken in connection with the accompanying drawings, in which—

Figure 1 is a view of the braking apparatus as seen from the inner side of the wheel;

Figure 2 is a section substantially on the line 2—2 of Figure 1;

Figure 3 is a vertical transverse section substantially on the line 3—3 of Figure 2;

Figure 4 is a view from the line 4—4 of Figures 1 and 3, and

Figure 5 is a view from the line 5—5 of Figure 3.

Referring now to the drawings, in which like reference characters indicate like parts in the several views, 10 indicates the bearing members at the end of a front axle, and 11 the steering knuckle which is secured to the members 10 through the medium of the usual pivot pin. Carried by the steering knuckle 11 is the axle 12 on which the hub 13, having the spokes 14, is rotatably mounted. Secured to the hub 13 and spokes 14, in the usual or any desired manner, is the brake drum 15. Positioned about the drum 15 is the brake band 16, the ends of which terminate in the threaded lugs 17.

Rigidly secured to the steering knuckle 11 or to the axle 12, in any desired manner, is the dust guard or brake drum closure plate 18. Secured to the closure plate 18, by means of the bolts 19, is the yoke member 20. Yoke 20 has its opposite ends rebent to provide the semi-circular bearing surfaces 21, the ends 22 each being provided with a pair of integral downwardly extending parallel ears 23 which are perforated to permit the passage of the bolts 19. Positioned between the ears 23 are the sleeves 24 which may be integral with the spacing member 25, as shown in Figure 3.

Positioned within the semi-circular bearings 21 of the yoke member 20 are the pivot pins 26 which are formed integral with the brake operating levers 27. Each of the levers 27 has an upwardly and then inwardly extending portion 28 provided with a perforation 29 through which one of the lugs 17 extends.

Positioned on the threaded lug 17 is a nut 30 provided with a sleeve 31 about which is positioned the compression coil spring 32, the opposite end of the spring 32 abutting the stop 33 carried at the end of the arm 34 which extends outwardly, upwardly and then inwardly from the edge of the yoke 20. Although in the present disclosure, the arm 34 is shown integral with the yoke 20, if desired, it may be readily formed separately therefrom and secured to the yoke by means of rivets in an obvious manner.

Positioned below the securing bolts 19 is the block 35 of the brake operating cylinder 36 which, it may be briefly explained here, is supported solely by the brake operating levers 27. Slidable within the cylinder 36 is a piston 37 comprising the usual cup leather 38. The piston 37 is carried at the end of the piston rod or plunger 39 which extends through aligned openings in the metal discs or washers 40 and the felt washers 41, the washers being maintained in position by means of the expanding C-ring 42 received in the groove 43. The end of the plunger is provided with the rounded shoulder 44 which terminates in a pin 45 received in an opening 46 in the lower end 47 of one of the brake levers 27, the inner surface of the brake lever adjacent to the opening 46 being recessed, as indicated at 48, to receive the rounded shoulder 44 of the plunger 39.

As the lever 27 shown at the right in Figure 3 is substantially the same as the one at the left, except that the lower end of the downwardly projecting arm 47' is provided with a differently shaped opening, only this portion of the right lever will be described.

Projecting centrally from the end of the cylinder block 35 is a rectangular lug 49 which is received by a corresponding opening 50. The rectangular lug 49 and the corresponding opening 50 act to prevent rotation of the cylinder. The arm 47' is also provided with the curved lugs 51, one at each side of the lug 49, which bear against the end of the cylinder block 35 and take the thrust.

Extending laterally from the cylinder through an opening 52 in the plate 18 is the hollow lug 53 through which fluid under pressure may be conveyed to the cylinder 36 where it enters beyond the end of the piston through an opening indicated at 54. In Figure 4, 55 indicates a hose or conduit through which fluid may be conveyed to the hollow lug 53.

The pivot members 26 carried by the brake arms are provided adjacent to their free ends with the circumferential grooves 56 which are engaged by the lugs 57 struck downwardly from the edge of the yoke member 20. This arrangement permits the members 26 freely to rotate within the bearing member but prevents longitudinal movement.

In the present structure, it will be noted that the downwardly extending arm of the brake operating lever is positioned entirely within the closure plate 18, and that the levers are provided with what may be termed hub portions 58 which pass outwardly through the notches 59 in the closure plate 18.

Assuming that the piston is at its extreme innermost position within the cylinder and the other parts occupy positions substantially as shown in Figure 3, the brake band will be expanded and free from engagement with the brake drum. If now it is desired to apply the brake, fluid under pressure is conveyed through the hose or conduit 55 and hollow lug 53 to the cylinder adjacent to the closed end thereof. This will result in moving the piston to the left, as seen in Figure 3, and the cylinder block simultaneously to the right, thus moving the lower ends 47 and 47' of the levers from each other, and the upper ends of the brake operating levers towards each other, and tightening the brake band about the brake drum. As soon as the pressure is removed from the fluid within the cylinder, the springs 32 operate to move the upper ends of the brake operating levers from each other and their lower ends toward each other, thus causing the piston to move to its innermost position in the cylinder and simultaneously releasing the brake band from the brake drum.

It will be noted that the brake operating levers, brake operating cylinder, brake band and the spring abutments 33 are all supported on the closure plate by the single pair of bolts 19. Thus, it is obvious that after the wheel with the brake drum attached has been removed, the brake mechanism may be readily removed substantially as a unit and another one substituted therefor. Also the wheel and brake drum may be readily removed and replaced in position without disturbing the braking apparatus.

Due to the fact that the brake operating cylinder is supported at the ends of the brake operating levers, it is possible to actuate the levers simultaneously in opposite directions by the use of a single piston within the cylinder, thus obviating the use of a pair of oppositely movable pistons which have been necessary where the cylinder has been rigidly supported.

While in the drawings and the above description a single set of details has been disclosed, certain modifications are contemplated and the invention, therefore, should be limited merely by the scope of the appended claims.

Having now described my invention, what I claim as new and desire to secure by Letters Patent of the United States is:

1. In a fluid operated brake system, an axle, a wheel thereon, a brake drum fixed to said wheel, a brake band adjacent to said drum, a pair of levers for forcing said band into braking engagement with said drum, a cylinder, a piston in said cylinder for actuating said levers, and means whereby said piston and cylinder are supported by said levers.

2. In a fluid operated brake system, an axle, a wheel thereon, a brake drum fixed to said wheel, a brake band adjacent to said drum, a pair of levers, each having an end engaged with a corresponding end of said band, a cylinder, a piston in said cylinder for operating said levers, and means for supporting said cylinder and piston from said levers.

3. In a fluid operated brake system, an axle, a wheel thereon, a brake drum fixed to said wheel, a brake band about said drum, a pair of levers, each having an end engaged with a corresponding end of said band, a cylinder, a piston in said cylinder for operating said levers, and means for supporting said cylinder and piston from said levers.

4. In a fluid operated brake system, an axle, a wheel thereon, a brake drum fixed to said wheel, a brake band about said drum, a pair of levers, each having an end engaged with a corresponding end of said band, a cylinder positioned within said drum, a piston in said cylinder for operating said levers, and means for supporting said cylinder and piston from said levers.

5. In a fluid operated brake system, an axle, a wheel thereon, a brake drum fixed to said wheel, a brake band adjacent to said drum, a yoke supported by said axle, a pair of levers pivotally supported on said yoke, each of said levers having an end engaged with a corresponding end of said band, a cylinder, a piston in said cylinder for operating said levers, and means for supporting said cylinder and piston from said levers.

6. In a fluid operated brake system, an axle, a wheel thereon, a brake drum fixed to said wheel, a brake band adjacent to said drum, a yoke supported by said axle within said drum, a pair of levers pivotally supported on said yoke, each of said levers having an end engaged with a corresponding end of said band, a cylinder, a piston within said cylinder for operating said levers, and means for supporting said cylinder and piston from said levers.

7. In a fluid operated brake system, an axle, a wheel thereon, a brake drum fixed to said wheel, a brake band about said drum, a yoke supported by said axle, a pair of levers pivotally supported on said yoke, each of said levers having an end engaged with a corresponding end of said band, a cylinder positioned within said drum, a piston in said cylinder for operating said levers, and means for supporting said cylinder and piston from said levers.

8. In a fluid operated brake system, an axle, a wheel thereon, a brake drum fixed to said wheel, a brake band about said drum, a yoke supported by said axle within said drum, a pair of levers pivotally supported on said yoke, each of said levers having an end engaged with a corresponding end of said band, a cylinder positioned within said drum, a piston in said cylinder for operating said levers, and means for supporting said cylinder and piston from said levers.

9. In a fluid operated brake system, an axle, a wheel thereon, a brake drum fixed to said wheel, a brake band adjacent to said drum, a pair of levers, each having an end engaged with a corresponding end of said band, a cylinder having its closed end pivotally joined to one of said levers, and a piston in said cylinder pivotally joined to the other of said levers.

10. In a fluid operated brake system, an axle, a wheel thereon, a brake drum fixed to said wheel, a brake band about said drum, a pair of levers, each having an end engaged with a corresponding end of said band, a brake operating cylinder having its closed end pivotally joined to the free end of one of said levers, and a piston in said cylinder pivotally joined to the free end of the other of said levers.

11. In a fluid operated brake system, an axle, a wheel thereon, a brake drum fixed to said wheel, a brake band about said drum, a pair of levers, each having an end engaged with a corresponding end of said band, a cylinder positioned within said drum, said cylinder having its closed end pivotally joined to the free end of one of said levers, and a piston within said cylinder pivotally joined to the free end of the other of said levers.

12. In a fluid operated brake system, an axle, a wheel thereon, a brake drum fixed to said wheel, a brake band about said drum, a yoke supported by said axle within said drum, a pair of levers pivotally supported on said yoke, each of said levers having an end engaged with a corresponding end of said band, a cylinder positioned within said drum, said cylinder having its closed end pivotally joined to the free end of one of said levers, and a piston within said cylinder pivotally joined to the free end of the other of said levers.

In witness whereof, I hereunto subscribe my name this 7th day of December, 1923.

MALCOLM LOUGHEAD.

Witnesses:
D. O. SCOTT,
M. R. SHERBINO.